Nov. 9, 1965 W. T. O'SHIELDS 3,216,104
METHOD OF ASSEMBLY OF A POWER TAKE-OFF AND ENGINE
Filed Oct. 11, 1961 3 Sheets-Sheet 1

William T. O'Shields
INVENTOR.

BY Clarence A. O'Brien
and Harvey B. Jacobson
Attorneys

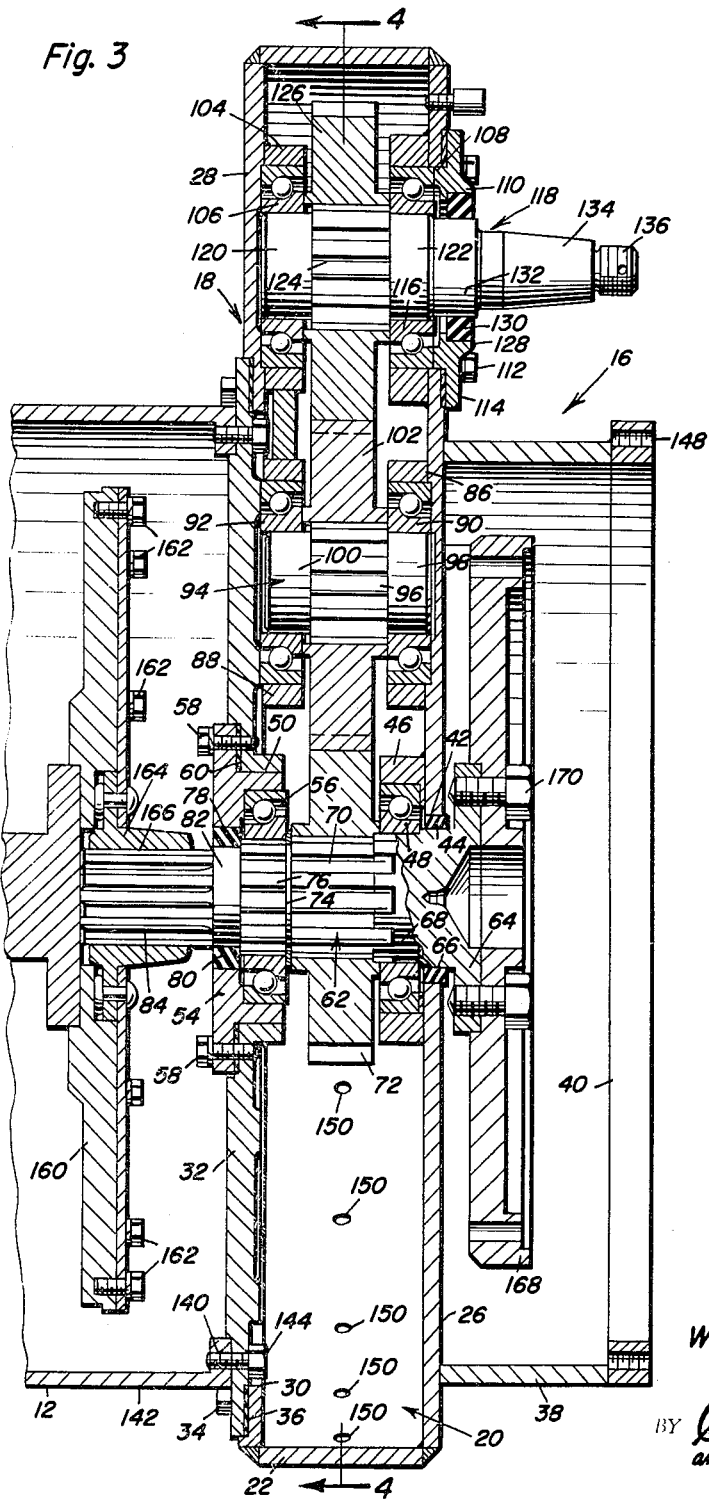

Nov. 9, 1965 W. T. O'SHIELDS 3,216,104
METHOD OF ASSEMBLY OF A POWER TAKE-OFF AND ENGINE
Filed Oct. 11, 1961 3 Sheets-Sheet 3
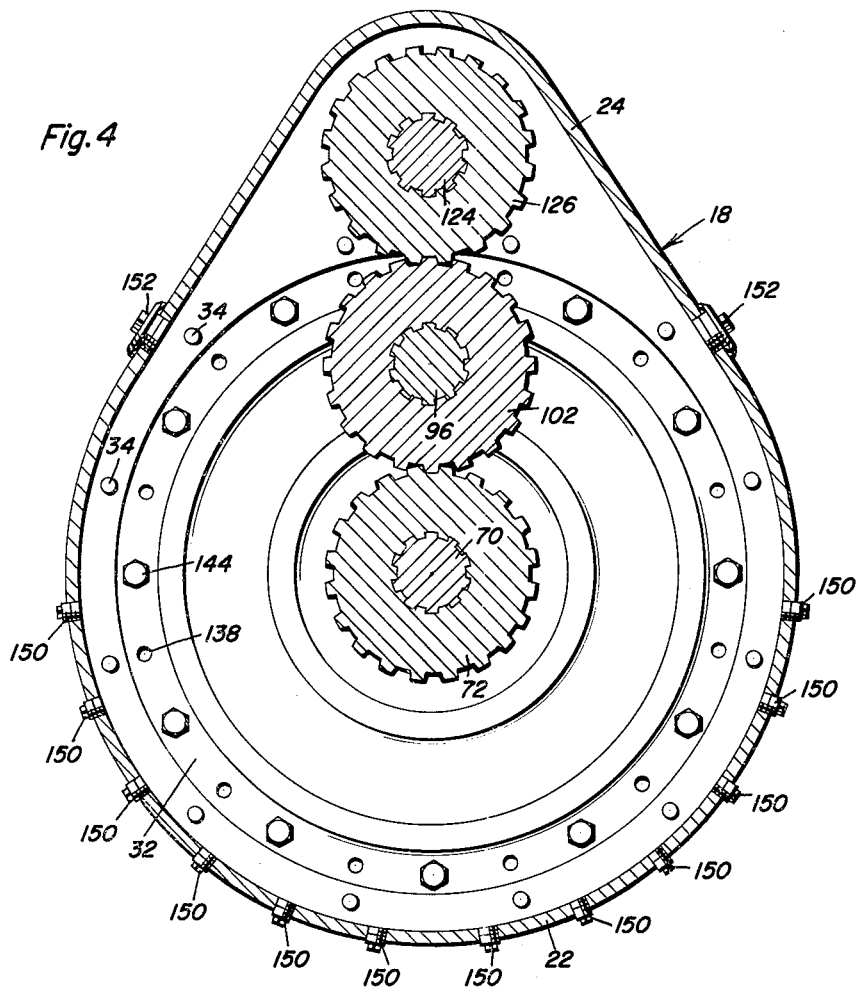
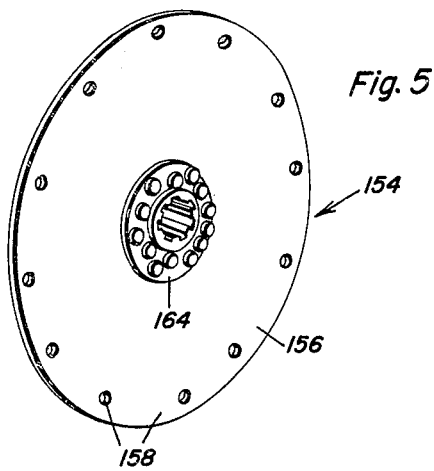
William T. O'Shields
INVENTOR.

United States Patent Office 3,216,104
Patented Nov. 9, 1965

3,216,104
METHOD OF ASSEMBLY OF A POWER TAKE-OFF AND ENGINE
William T. O'Shields, Tulsa, Okla., assignor to CCI Corporation, a corporation of Delaware
Filed Oct. 11, 1961, Ser. No. 144,343
4 Claims. (Cl. 29—469)

This invention relates in general to new and useful method of assembling a flywheel power take-off. This application is a continuation-in-part of copending application Serial No. 712,012, filed January 29, 1958, now abandoned, for Flywheel Power Take-Off.

For many years automotive vehicles, particularly trucks, have been provided with power take-offs for the purpose of obtaining an auxiliary drive from the engine of the vehicle. However, the power take-offs which are practical and which are in use at the present time are a part of the transmission and very limited in adaptability. First, many of the power take-offs are so constructed that power to two output shafts cannot be obtained simultaneously. Secondly, because of the manufacturing problem, the power take-off can be placed in only one position, otherwise numerous housings would be required in the transmission design. Further, because of the construction of power take-offs on transmission cases, a wide range of gears cannot be obtained.

As a result of the limited adaptability of power take-offs now available, many types of equipment include an engine for the truck on which it is mounted together with a separate engine for the equipment. This results in not only the added cost of the additional engine, but also the added weight of the additional engine. It is therefore the primary object of this invention to provide a method of assembling a power take-off which is of such a nature that the power from the engine of the vehicle on which the equipment is mounted may be used as desired with equipment thus eliminating the requirement for a second engine especially for the equipment.

Another object of this invention is to provide a method of assembling a power take-off unit which is in the form of an adapter which may be placed between the engine and transmission of a truck, which adapter requires very little adaptation of the truck for the reception thereof and which will provide the full power from the engine as desired by the equipmment to which the power take-off may be connected.

Still another object of this invention is to provide a method of assembling an improved power take-off adapter for vehicles, the power take-off being so constructed that the full power of the engine may be delivered either to the main shaft of the vehicle or to the power take-off shaft, as desired, and when necessary, the two drives may be powered at the same time.

Another object of this invention is to provide a method of assembling an improved power take-off adapter which may be mounted between the engine and transmission of an automotive vehicle, the power take-off adapter being of such a construction that it may be provided with a clutch so that the clutches for the two drives, the power take-off drive and the main shaft drive, are disposed rearwardly of the point of division of the drives thus allowing engagement and disengagement of either power drive without interruption of the other power drive.

A further object of this invention is to provide a method of assembling an improved power take-off shaft adapter, the power take-off shaft adapter being so constructed that the gears thereof may be readily replaced or interchanged as desired thereby providing a plurality of output shaft drive ratios for the power take-off shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged vertical longitudinal sectional view taken through the power take-off adapter and shows the specific details thereof including the connection between the power take-off adapter and the engine bell housing and the flywheel thereof;

FIGURE 4 is a vertical sectional view taken upon a reduced scale substantially upon the plane indicated by the section line 4—4 of FIGURE 3 and shows the details of the gear train of the power take-off; and FIGURE 5 is an enlarged rotated perspective view of a flywheel adapter plate together with a hub element which connects the power take-off adapter to the flywheel of the engine.

Figure 1:
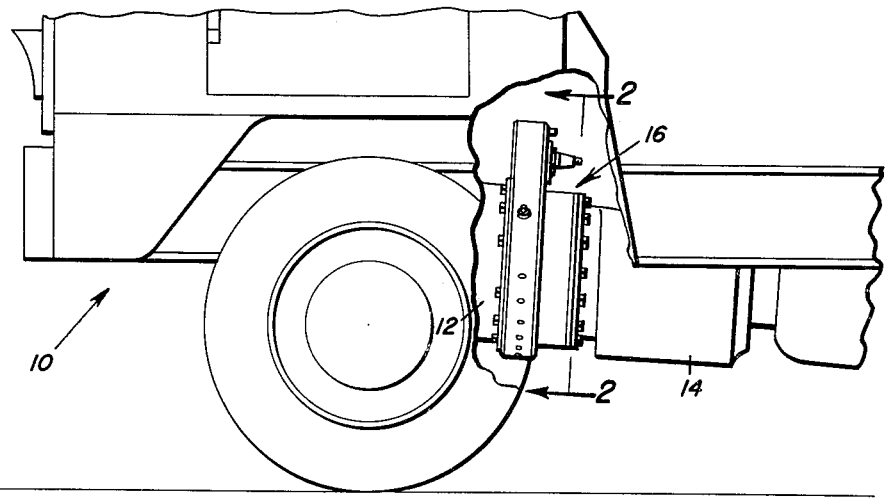
FIGURE 1 is a fragmentary elevational view with portions broken away of an automotive vehicle incorporating the flywheel power take-off adapter which is the subject of this invention and shows the general location thereof.

Referring now to FIGURE 1, it will be seen that there is illustrated a portion of a conventional type truck which is referred to by the reference numeral 10. The truck 10, while it is illustrated as a cab over engine type, may be of any type. The truck 10 includes an engine 12, which is conventional, and a transmission 14, which is also conventional. The transmission 14 has been moved rearwardly a slight distance relative to the engine 12 from its normal position and there has been interposed between the engine 12 and the transmission 14 the power take-off which is the subject of this invention, the power take-off being referred to in general by the reference numeral 16.

Referring now to FIGURES 3 and 4 in particular, it will be seen that the power take-off 16 includes a housing which is referred to in general by the reference numeral 18. The housing 18 includes a liquid tight forward portion 20 which is formed by a body member 22 which is generally circular in outline, but has an outwardly offset portion 24, as is best shown in FIGURE 4. The rear end of the body portion 22 has connected thereto a rear end wall 26. The body portion 22 also has connected to the forward end thereof a front wall 28. The front wall 28 has an enlarged circular opening 30 which is closed by an adapter plate 32 which functions as a cover plate. The adapter plate 32 is secured to the front wall 28 by means of a plurality of bolts 34 and is sealed relative thereto by means of a gasket 36.

The housing 18 also includes a rearwardly extending bell housing 38 which terminates in a mounting flange 40.

The end wall 26 is provided with an opening 42. The opening 42 is disposed concentric with the bell housing 38 and the adapter plate 32 and has positioned therein a suitable seal 44. Disposed concentric to the opening 42 is a bearing retainer ring 46 in which there is seated a bearing 48.

Disposed concentric with the axis of the opening 42 is an opening 50 in the adapter plate 32. Projecting into the opening 50 is a bearing retainer 54 which carries a bearing 56. The bearing retainer 54 is removably secured to the adapter plate 32 by means of a plurality of bolts 58 and is sealed relative thereto by means of a gasket 60.

Rotatably journaled in the bearings 48 and 56 is an adapter drive shaft which is referred to in general by the reference numeral 62. The adapter drive shaft 62 includes a flywheel mounting flange 64 at the right end thereof. Disposed adjacent the flywheel mounting flange 64 is a seal engaging surface 66 for cooperating with the seal 44. Disposed next to the seal engaging surface 66 is a bearing seat area 68 for the bearing 48. The central part of the adapter shaft 52 is splined as at 70. Removably engaged with the spline 70 is an internally splined drive gear 72. The drive gear 72 is retained on the adapter shaft 62 by means of a snap ring 74. Disposed to the left of the snap ring 74 is a bearing seat area 76 receiving the bearing 56.

The bearing retainer 54 is provided with an opening in the outer part thereof, the opening being referred to by the reference numeral 78 and having seated therein a seal 80. The adapter shaft 62 has a seal engaging surface 82 which cooperates with the seal 80. The forward end of the adapter shaft 62 terminates in splines 84.

Spaced from the bearing retaining ring 46 is a bearing retaining ring 86 carried by the inner surface of the end wall 26. Carried by the adapter plate 32 in alignment with the bearing retaining ring 86 is a bearing retaining ring 88. Positioned in the bearing retaining ring 86 is a bearing 90 which is aligned with a bearing 92 positioned in the bearing retaining ring 88.

Carried by the bearings 90 and 92 is an idler shaft which is referred to in general by the reference numeral 94. The idler shaft 94 includes an enlarged intermediate splined portion 96 and bearing engaging end portions 98 and 100. The bearing engaging portion 98 receives the bearing 90 whereas the engaging portion 100 receives the bearing 92 so that the idler shaft 94 is journaled for rotation. Removably splined on the splined portion 96 is an idler gear 102 which is meshed with the drive gear 72.

Secured to the inner face of the end wall 28 is a bearing retaining ring 104. The bearing retaining ring 104 has seated therein a bearing 106.

Disposed concentric with the axis of the bearing retaining ring 104 is an opening 108 in the end wall 26. Seated in the opening 108 is a portion of a bearing retainer 110, which bearing retainer 110 is secured to the end wall 26 by means of a plurality of bolts 112 and which is sealed relative thereto by a gasket 114. The bearing retainer 110 carries a bearing 116 which is aligned with the bearing 106.

Extending through the bearings 106 and 116 and rotatably journaled thereby is a power take-off shaft which is referred to in general by the reference numeral 118. The power take-off shaft 118 has disposed at the left end thereof, as viewed in FIGURE 3, a bearing engaging portion 120 on which the bearing 106 is received. An intermediate part of the power take-off shaft 118 is in the form of a bearing engaging portion 122 which receives the bearing 116. Disposed intermediate the bearing engaging portions 120 and 122 is an enlarged splined portion 124 on which there is removably splined a drive gear 126. The driven gear 126 is meshed with the idler gear 102 so as to be driven thereby.

The bearing retainer 110 has an outer opening 128 in which there is seated a seal 130. The power take-off shaft 118 is formed to the right of the bearing engaging portion 122 with a seal engaging surface 132 which engages the seal 130 and cooperates therewith to seal the power take-off shaft 118.

In order that a suitable drive shaft may be connected to the power take-off shaft 118, the right hand end thereof, as viewed in FIGURE 3, is tapered as at 134. Also, the extreme end of the power take-off shaft 118 is reduced and externally threaded as at 136. At this time it is pointed out that any type of drive shaft may be connected to the power take-off shaft 118 and, if desired, a declutch mechanism may be mounted in such a drive shaft. However, inasmuch as the details of the power drive shaft and the declutch mechanism is not a part of this invention, they have not been illustrated nor will they be described in more detail hereinafter.

Figure 2:
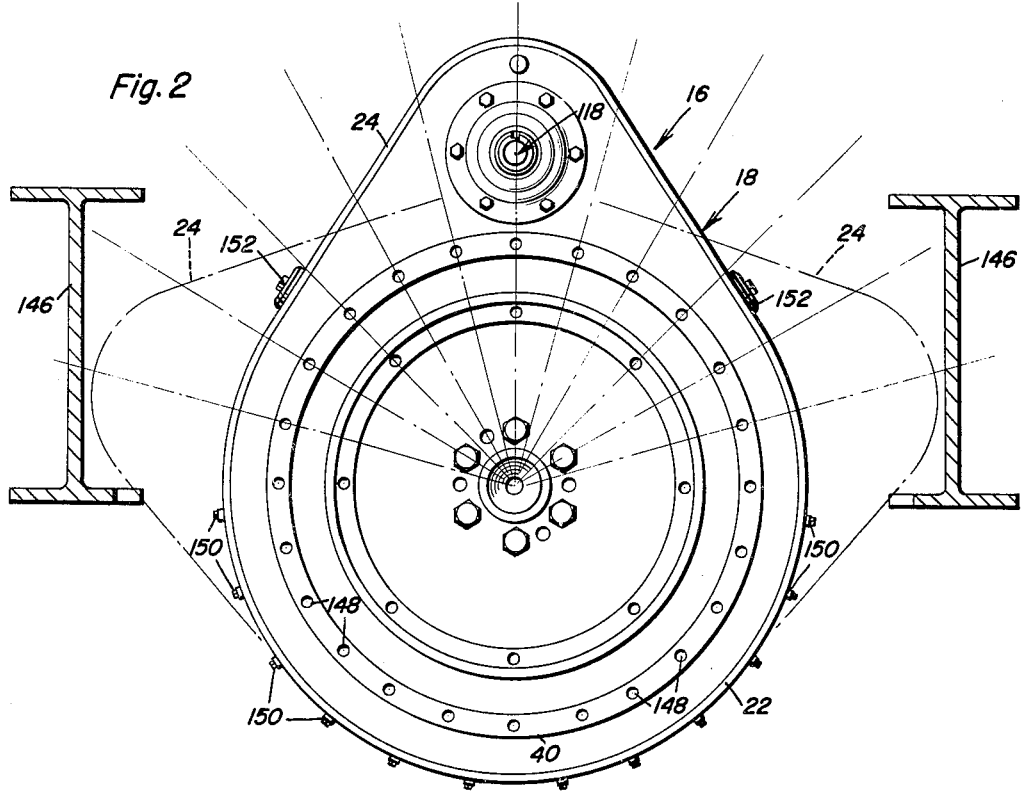
FIGURE 2 is an enlarged fragmentary sectional view taken substantially upon the plane indicated by the section line 2—2 of FIGURE 1 and shows the various positions obtainable with the power take-off shaft so as to increase the adaptability of the invention, the connection between the power take-off adapter and the transmission being omitted for purposes of clarity.

As is best shown in FIGURE 4, the adapter plate 32 has a bolt pattern 138 which corresponds in diameter to the bolt pattern of threaded bolt holes 140 of a bell housing 142 of the engine 12. Thus the adapter housing 18 may be readily bolted to the engine 12. Further, as is clearly shown in FIGURE 4, the number of bolt holes of the bolt pattern 138 is twice as many as the number of bolt holes 140. Thus bolts 144 which secure the adapter plate 32 to the engine 12 bell housing 142 are received only in one-half of the bolt holes of the bolt pattern 138. The purpose of this arrangement is to permit the adapter housing 18 to be rotated relative to the engine 12 so that the power take-off shaft 118 may be positioned as desired relative to the truck 10. As is best shown in FIGURE 2, the positions of the power take-off shaft 118 are numerous and the frame rails 146 of the truck 10 are the only limiting features as to the positioning of the power take-off shaft 118.

The flange 40 is provided with a plurality of internally threaded bolt holes 148. The bolt holes 148 correspond in position and number to the bolt holes of the bolt pattern 138. Thus irrespective of the angle through which the adapter housing is turned, the transmission 14 may be readily bolted to the adapter housing 18. At this time it is pointed out that the number of the bolt holes 138 and 148 will be unit multiples of the number of the bolt holes of the engine 12 and the transmission 14, thus permitting the proper positioning of the adapter housing 18.

In order to compensate for the rotation of the adapter housing 18, the body portion 22 is provided with a plurality of drain plugs 150. Thus at all times one of the drain plugs 150 will be disposed near the bottom of the liquid tight portion 20 to facilitate the draining of the oil therefrom. It is pointed out that oil is stored in the liquid tight portion 20 to lubricate the bearings and gears of the drive train. Although the gears are lubricated by a splash method at the present time, it is to be understood that a pressure lubricating system could be provided. Also, two filler plugs carried by the upper part 24 are provided. The filler plugs are referred to by the reference numeral 152 and are disposed on opposite sides of the body portion 22.

In order to facilitate the connection of the power take-off 16 to the engine 12, there is provided a flywheel adapter which is referred to in general by the reference numeral 154. The flywheel adapter 154 includes an adapter drive plate 156 having a plurality of bolt holes 158 which are arranged in the same bolt pattern as those by which the clutch is normally carried by a flywheel 160 of the engine 12. Thus the adapter drive plate 156 may be readily secured to the flywheel 160 by a plurality of bolts 162.

The flywheel adapter 154 also includes a hub 164. The hub 164 is internally splined as at 166 and receives the splined end 84 of the shaft 62. Thus the adapter shaft 62 is directly coupled to the engine 12 for rotation thereby.

Secured to the mounting flange 64 of the adapter shaft 62 is a second flywheel 168. The flywheel 168 is so constructed that it may have bolted thereto the conventional or original clutch assembly (not shown) for the transmission 14. The clutch assembly (not shown) will be operated in the normal manner as the clutch for the transmission 14. The flywheel 168 is secured to the flange 64 by means of bolts 170.

In the mounting of the power take-off 16, it is merely necessary to move the transmission 14 and the attached clutch assembly rearwardly a distance equal to the length of the power take-off 16. This will require the provision of new transmission mounts and a change of the transmission and clutch-operating linkage in the event of an old construction and merely the properly positioning of the transmission mounts and the provision of proper linkage in the event of new construction. Also, the drive shaft normally connecting the transmission to the rear wheels (not shown) of the truck 10 will have to be shortened a length equal to the length of the power take-off unit 16. This, of course, will raise no problem. In an already assembled engine, clutch and transmission assembly, the original clutch and transmission are disconnected from the engine and moved rearwardly a distance sufficient to accommodate the power take-off. The power take-off is then attached to the engine and the original clutch and transmission attached to the power take-off. In new construction, a conventional clutch and transmission assembly is displaced rearwardly from its normal position a distance to accommodate the power take-off unit and attached thereto after the power take-off unit is attached to a conventional engine.

In view of the fact that the power take-off unit 16 may be rotated as is desired to position the power take-off shaft 118, it will be seen that the adaptability of the power take-off unit 16 is much greater than that wherein the power take-off is a part of the transmission and whose position is fixed. Also, by providing the gears 72, 102 and 126 which may be readily removed, the drive ratio between the engine speed and the power take-off shaft speed may be varied to that desired for the particular requirements. This coupled with the fact that through the provision of a clutch to the rear of the power take-off shaft 118, the two power shafts extending rearwardly from the power take-off unit may be separately driven and engaged and disengaged whenever desired without interfering with the other drive is a great improvement over present power take-offs. Because of the adaptability of the power take-off unit, it will be readily apparent that in new construction, and in some old construction, engines which would be used or have been used may be eliminated and the truck engine may be used for powering both the truck and the equipment carried thereby. This will result in a saving in both cost and weight, both of which are a factor in construction.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A method of conversion of an automotive vehicle of the type having an engine with a crankshaft and flywheel at one end thereof, a flywheel housing, a clutch assembly housing with a clutch assembly therein coupled to said flywheel, fastening means on both said housings for connecting the latter, a vehicle transmission housing and transmission connected to said clutch assembly housing and coupled to said clutch assembly for driving a drive shaft for the purpose of taking power from the engine independently of the supply and control of power from the engine independently of the supply and control of power from the engine to the clutch assembly comprising the steps of; disconnecting the clutch assembly housing and clutch assembly from the flywheel housing and flywheel and moving the former rearwardly from the latter, also moving the transmission housing and transmission rearwardly and shortening the drive shaft, interposing a power take-off unit between the flywheel and the rearwardly displaced clutch assembly, connecting the interposed unit to the flywheel and flywheel housing, establishing a direct and continuous drive between the engine and the interposed unit, connecting the clutch assembly housing to the power take-off unit, taking off continuous uninterrupted power from the interposed unit.

2. A method of conversion of an automotive vehicle of the type having an engine with a crankshaft and flywheel at one end thereof, a flywheel housing, a clutch assembly housing with a clutch assembly therein coupled to said flywheel, fastening means on both said housings for connecting the latter, a vehicle transmission housing and transmission connected to said clutch assembly housing and coupled to said clutch assembly for driving a drive shaft for the purpose of taking power from the engine independently of the supply and control of power from the engine to the clutch assembly comprising the steps of; disconnecting the clutch assembly housing and clutch assembly from the flywheel housing and flywheel and moving the former rearwardly from the latter, also moving the transmission housing and transmission rearwardly and shortening the drive shaft, interposing a power take-off unit between the flywheel and the rearwardly displaced clutch assembly, connecting the interposed unit to the flywheel housing and the crankshaft within the flywheel housing, establishing a direct and continuous drive between the engine and the interposed unit, connecting the clutch assembly housing to the power take-off unit, taking off continuous uninterrupted power from the interposed unit.

3. The method of converting an automotive vehicle of the type having an engine provided with a crankshaft, a flywheel mounted on the crankshaft, a flywheel housing enclosing the periphery of the flywheel, a vehicle transmission including a clutch assembly selectively driving the transmission from the flywheel, and a housing for the transmission and clutch assembly mounted directly on the flywheel housing, and a drive shaft driven from the transmission to an automotive vehicle of the type having a power take-off of the type having an input shaft aligned with the crankshaft, an output shaft parallel with the input shaft but spaced laterally therefrom, means continuously and positively interconnecting said output and input shafts, a housing, an adapter drive plate connected to one end of the input shaft, and a second flywheel connected directly to the other end of said input shaft, said method consisting of the steps of disconnecting the transmission and clutch assembly housing from the flywheel housing, disconnecting the clutch assembly from the crankshaft flywheel, moving the clutch assembly, transmission and the housing therefor into spaced relation to the crankshaft flywheel and flywheel housing while maintaining axial alignment and shortening the length of the drive shaft, inserting the power take-off assembly and housing therefor including an adapter mounting plate between the engine and the vehicle transmission, orienting the output shaft in a selected angular orientation about the rotational axis of the crankshaft, directly connecting the adapter mounting plate on the power take-off assembly housing to the flywheel housing, directly connecting the housing for the clutch assembly and transmission to the power take-off assembly housing, establishing a direct positive driving connection between the crankshaft flywheel and the adapter drive plate, and selectively engaging the clutch assembly with the second flywheel whereby the transmission is selectively driven from the crankshaft and the output shaft of the power take-off is continuously and drivingly connected to the crankshaft through the input shaft, adapter drive plate and crankshaft flywheel.

4. The method of assembling an automotive vehicle drive system comprising the steps of:
   (a) disposing an engine with an output shaft in a predetermined position;
   (b) connecting a first housing to the engine;
   (c) connecting a first flywheel to the output shaft of the engine;
   (d) connecting to the first housing a power take-off assembly and housing having an adapter member and a power take-off input drive shaft and a power take-off output shaft including the steps of:
      (1) aligning the adapter member and power take-off input drive shaft with the engine output shaft,
(2) permanently rigidly connecting the power take-off input drive shaft and the first flywheel by means of said adapter member,
(3) orienting the output shaft of the power take-off to a selected desired circumferential position about the center of rotation of the power take-off input drive shaft,
(4) attaching the power take-off housing to the first housing while maintaining the aforesaid position of the power take-off output shaft;

(e) connecting a second flywheel to the power take-off input drive shaft at the oposite end thereof in relation to the engine; and
(f) directly connecting a clutch housing and transmission assembly to the power take-off housing for selectively engaging a clutch with the second flywheel.

References Cited by the Examiner
UNITED STATES PATENTS
2,680,377   6/54   Gerst _____ 74—15.84

WHITMORE A. WILTZ, *Primary Examiner.*